March 24, 1942. T. MAGIERA 2,277,340
HEATER
Filed Feb. 3, 1941 2 Sheets-Sheet 1
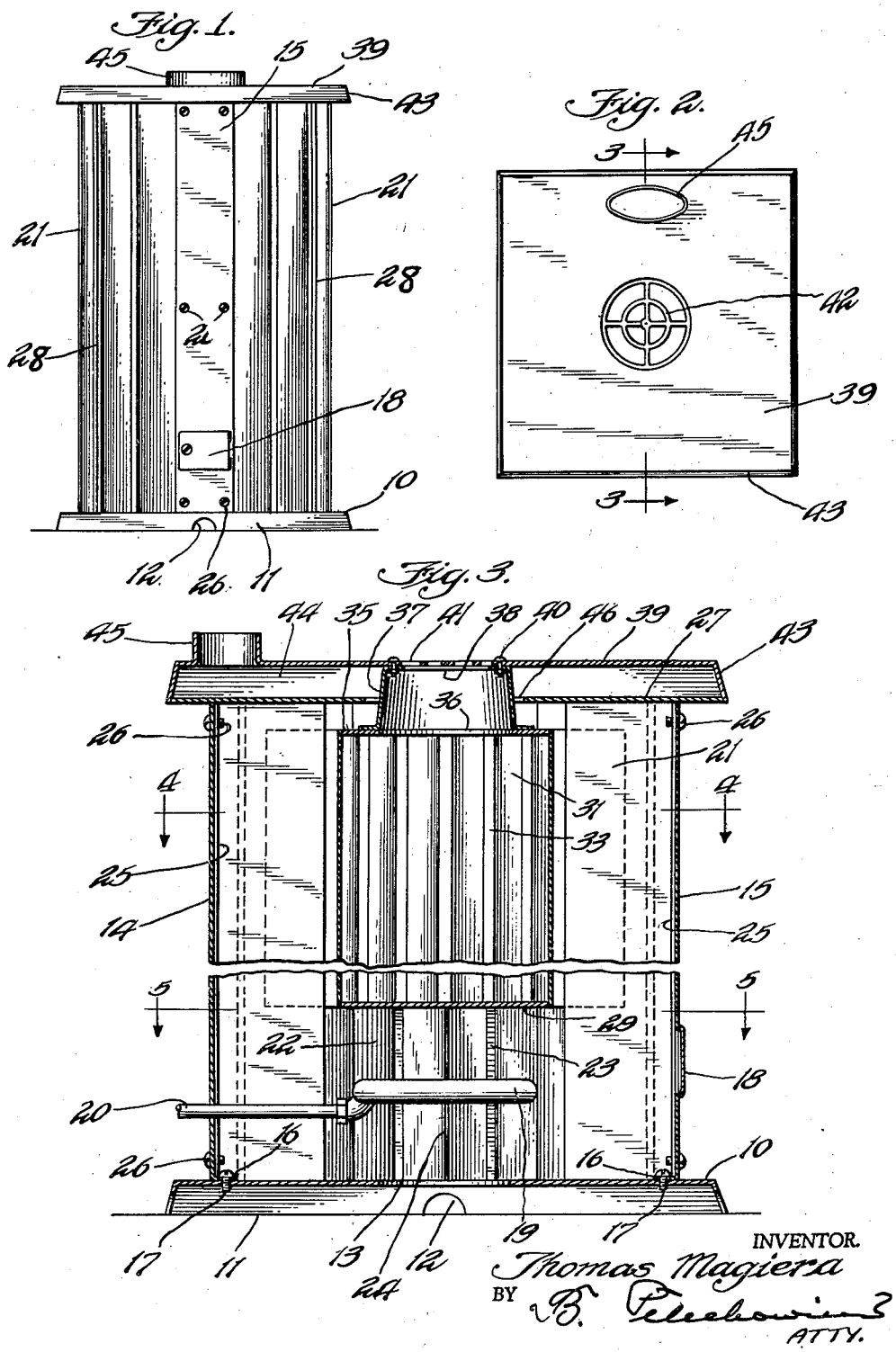

March 24, 1942.  T. MAGIERA  2,277,340
HEATER
Filed Feb. 3, 1941  2 Sheets-Sheet 2

INVENTOR.
Thomas Magiera
BY B. Pelechowicz
ATTY.

Patented Mar. 24, 1942

2,277,340

UNITED STATES PATENT OFFICE 2,277,340

HEATER

Thomas Magiera, Chicago, Ill.

Application February 3, 1941, Serial No. 377,111

2 Claims. (Cl. 126—70)

This is a continuation in part of application filed April 1, 1940, Serial No. 327,108.

The present invention relates to heaters and has for its principal object the provision of a heater having a radiating surface increased to a maximum, so as to obtain from the heater the maximum of heating efficiency from the combustion gases generated therewithin before the same pass to the outside.

A still further object of the present invention is the provision of a heater, including a vertical wall of increased radiating surface, with a secondary heating chamber disposed within the said vertical outer wall, and wherein the air may be heated by the combustion gases before the same escape and from which the heated air may pass to the dwelling.

A still further object of the present invention is the provision of a heater of the character indicated having a vertical wall formed into a plurality of radial fins so as to increase the radiating surface thereof, with a secondary heating chamber disposed therewithin and having its vertical wall conforming to the configuration of the outer wall of the heater so that the two may form a space of comparatively small dimension so as to retard the combustion gases escaping into the flue in order to derive therefrom the maximum heating efficiency.

A still further object of the present invention is the provision of a heater having a vertical wall with a secondary heating chamber disposed therewithin, which latter chamber may include a bottom constituting a baffle plate, with the walls of the heater and said secondary heating chamber suitably spaced whereby the combustion gases may escape after deflection by said bottom or baffle plate in order to derive maximum heating efficiency from said escaping combustion gases.

A still further object of the present invention is the provision of a heater which may have a comparatively small number of parts and which may be capable of quick assembly or disassembly.

With the above general objects in view and others that will appear as the invention is better understood, the same consists in the novel construction, combination, and arrangement of parts hereinafter more fully described, illustrated in the accompanying drawings and pointed out in the appended claims.

In the drawings forming a part of this application, and in which like designating characters refer to corresponding parts throughout the several views:

Fig. 1 is a front elevational view of a heater;

Fig. 2 is a top elevational view thereof on a somewhat larger scale;

Fig. 3 is an enlarged vertical cross-sectional view on line 3—3 of Fig. 2;

Figure 4:
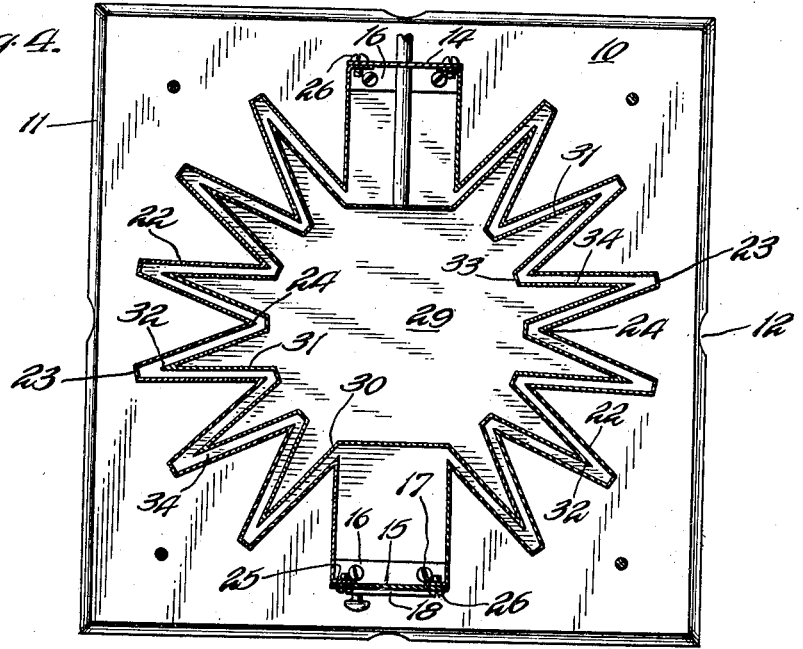
Fig. 4 is a transverse cross-sectional view on line 4—4 of Fig. 3.

Referring in detail to the present drawings there is shown therein base 10 of a square formation, having an outer downwardly inclined flange 11, the latter provided with a plurality of vents 12 for the purpose of permitting passage of air into the heater. Flange 11 provides a support upon which the heater is adapted to rest upon a floor.

Base 10 has a central round opening 13.

The heater further includes a rear wall 14 and a front wall 15, each of substantially the same width and height and each provided with an integrally formed and inwardly projecting angle piece 16 at its lower end, whereby through the medium of screws 17, said walls 14 and 15 are adapted to be rigidly affixed to base 10. It may be stated at this point that angle pieces 16 and screw 17 are the only and simple means of rigidly affixing the outer vertical wall of the heater hereinafter described to base 10. Front wall 15 is further provided with door 18, at its lower end, normally closing a corresponding opening, through which access may be had into the heater for the purpose of lighting burner 19 which rests upon and connects with fuel supplying pipe 20, which enters the heater through a suitable opening made in the rear wall 14 and adjacent the lower end thereof. Said burner 19 is disposed above draft opening 13.

Figure 5:
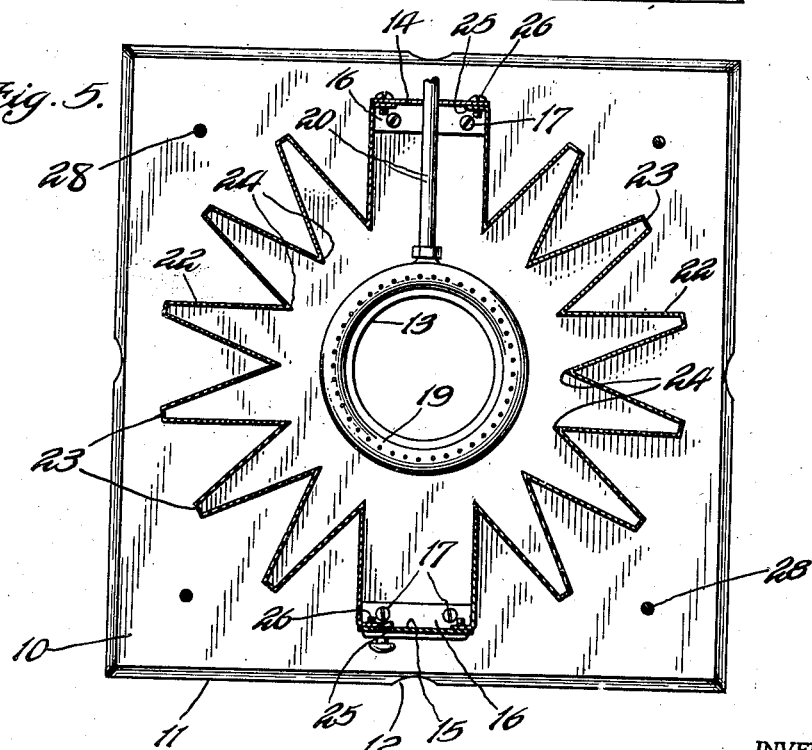
Fig. 5 is a transverse cross-sectional view on line 5—5 of Fig. 3.

The heater further includes side walls, generally indicated by 21, each provided with a plurality of fin-like corrugations 22 in lateral formation on a horizontal cross-section, said corrugations 22 of each side wall 21 being arranged in semi-annular formation on horizontal cross-section, so that when said side walls 21 are in an operative position shown in Figs. 4 or 5, with respect to walls 14 and 15 and base 10, the outwardly projecting apices of said corrugations 22 impart a cylindrical appearance to the outer apices of said corrugations 22 are blunt affecting flat surfaces 23, while the inner apices thereof are of sharp angular formation as at 24.

Vertical side edges of said side walls 21 are provided with vertical strips 25, which are in an angular relation with the adjacent side edge portion of each wall 21, and which are adapted to snugly rest upon the adjacent inner marginal faces of walls 14 and 15, and to which the same are attached by means of screws 26.

The lower ends of walls 14 and 15 and side walls 21 rest on base 10, while the upper ends thereof are on the same horizontal plane and are adapted to support a square plate 27.

Base 10 and plate 27 are connected at their corners by rods 28 for the purpose of maintaining said plate 27 in a relative rigid position with respect to base 10 and to vertical wall of the heater.

Receivable within the body of the heater including walls 14 and 15 and side walls 21, is a secondary heating chamber including bottom 29 disposed above burner 19, and vertical side wall 30 rigidly affixed to said bottom 29 and in spaced relation with side walls 21 including their radial fin-like corrugations 22. Thus said vertical wall 30 of the secondary heating chamber includes fin-like corrugations 31 corresponding to the number of corrugations in the two side walls 21. Bottom wall 29 is necessarily star-shaped to correspond to the corrugated outline of said vertical wall 30, except portions thereof oppositely disposed to walls 14 and 15, at which point the vertical wall 30 of the secondary heating chamber does not follow the general outline of the side edges of side walls 21 but passes them so as to define space of considerable width between walls 14 and 15 on one hand and the adjacent oppositely disposed portions of vertical wall 30 of said secondary heating chamber as is clearly seen in Fig. 4. Fin-like corrugations 31 generally follow the outline of corrugations 22 of side walls 21 with this difference, however, that the outer apices of said corrugations 31 are sharp-pointed as at 32, while the inner apices thereof are flat-surfaced as at 33. It is further observed that fin-like corrugations 31 of said secondary heating chamber are regularly spaced from corrugations 22 of vertical side walls 21 of the heater so as to define a regular space 34 therebetween affording passage for combustion gases which may be deflected by bottom 29 of said secondary heating chamber.

Said secondary heating chamber has a top closure plate 35 corresponding generally to the outline of said bottom 29, except that centrally it has a round opening 36.

Rigidly connected to said closure 35 and at the marginal portion thereof defined by said opening 36 is an open collar member 37, which at its upper end has an inward flange 38 by means of which it is rigidly attached to top fixture 39 through the medium of bolt and nut connnections 40. Said fixture 39 at its center is provided with an opening 41 communicating with collar member 37, and wherein a grill member 42 is removably receivable.

Said top fixture 39 is of a square formation corresponding in its outline to the formation of plate 27, and has a downwardly depending and outwardly inclined flange 43, the lower end of which is adapted to engage the marginal edge of plate 27 for the purpose of spacing said plate 27 from said top fixture 39 for providing chamber 44.

Said top fixture 39 is provided with a flue flange 45 through which the combustion gases may escape.

Plate 27 has a round central opening 46 adjacent the body portion of collar member 37.

From the hereinabove description it will be apparent that combustion gases formed within the heater by fuel combustion in burner 19, on striking bottom 29 of the secondary heating chamber, will be deflected therefrom laterally and will be forced to pass through space 34 as well as space defined by walls 14 and 15 and the oppositely disposed portions of vertical wall 30 of said secondary heating chamber and therefrom will be forced to pass vertically up to plate 27. Since the upper end of said secondary heating chamber stops short of said plate 27, or in other words, since the upper plate 35 of the secondary heating chamber is spaced away from said plate 27, the combustion gases will be forced laterally and towards collar member 37. From there and through opening 46, the combustion gases will pass past said plate 27 and within chamber 44 and from there through flue flange 45 to the outside.

It is further observed that the said secondary heating chamber is suspended within the heater from plate 35 by virtue of the rigid attachment of said secondary heating chamber thereto through the medium of said collar member 37.

So as to protect bottom 29 from the action of heat generated by burner 19 the same may be protected by a lining of some suitable refractory material, it being observed that all of the parts of the heater are made of metal.

Within spaces defined by walls 14 and 15 and the oppositely disposed adjacent portions of vertical wall 30 of secondary heating chamber, water containers may be placed for the purpose of heating water therein by the combustion gases generated below and passing laterally thereof.

From the hereinabove description it will be apparent that the secondary heating chamber disposed above burner 19 is isolated from all combustion gases generated within the lower end of the heater and which may pass past the vertical wall 30 of said secondary heating chamber. Circulation of clean air is had within said secondary heating chamber through openings 41 and 36.

While there is described herein a preferred embodiment of the present invention, it is nevertheless to be understood that minor changes may be made therein without departing from the spirit and scope of the invention as claimed.

What I claim as new is:

1. A heater comprising a horizontal base plate having a central air inlet opening and provided with means to support the same in an elevated position, vertical side walls disposed and secured upon the base plate and provided with fin-like vertical corrugations arranged in nearly semi-annular formation, said side walls being spaced apart at the front and back of the heater, flat front and rear walls connecting the side walls, said front wall having a door opening in the lower portion thereof, a door for said door opening, an upper horizontal plate secured on the upper edges of said side, front and rear walls and having a central opening for the escape of products of combustion, a secondary heating chamber arranged within the upper portion of the body formed by said side, front and rear walls, said heating chamber including an imperforate bottom spaced above the base plate and a vertical wall fixed to said bottom and provided with fin-like vertical corrugations uniformly spaced inwardly from the corrugations of said side walls and flat portions spaced from said front and rear walls, a closure plate for the top of said heating chamber spaced below said upper plate and having a central opening, a collar fixed on said closure plate and extending upwardly through and spaced from the wall of the central opening of said upper plate, a top fixture including a horizontal wall having a marginal depending flange secured upon said upper plate and provided with a flue flange, the horizontal wall of said top fixture further having a central opening communicating with said collar and having a grill therein.

2. A heater comprising a horizontal base plate having a central air inlet opening and provided with means to support the same in an elevated position, vertical side walls disposed and secured upon the base plate and provided with fin-like vertical corrugations arranged in nearly semi-annular formation, an upper horizontal plate secured on the upper edges of said side walls and having a central opening for the escape of products of combustion, a secondary heating chamber arranged within the upper portion of the body formed by said side walls, said heating chamber including an imperforate bottom spaced above the base plate and a vertical wall fixed to said bottom and provided with fin-like vertical corrugations uniformly spaced inwardly from the corrugations of said side walls, a closure plate for the top of said heating chamber spaced below said upper plate and having a central opening, a collar fixed on said closure plate and extending upwardly through and spaced from the wall of the central opening of said upper plate, a top fixture including a horizontal wall having a marginal depending flange secured upon said upper plate and provided with a flue flange, the horizontal wall of said top fixture further having a central opening communicating with said collar and having a grill therein.

THOMAS MAGIERA.